United States Patent [19]

Toulhoat et al.

[11] Patent Number: 4,719,195

[45] Date of Patent: Jan. 12, 1988

[54] PROCESS FOR PRESULFURIZING A HYDROGEN TREATMENT CATALYST

[75] Inventors: Hervé Toulhoat, Houilles; Georges Berrebi, Bourg les Valence, both of France

[73] Assignee: Europeenne de Retraitement de Catalyseurs (Eurecat), La Voulte sur Rhone, France

[21] Appl. No.: 793,043

[22] Filed: Oct. 30, 1985

[30] Foreign Application Priority Data

Oct. 30, 1984 [FR] France .................... 84 16540
Jul. 4, 1985 [FR] France .................... 85 10396

[51] Int. Cl.$^4$ .............. B01J 27/02; B01J 38/56; B01J 38/12; B01J 38/48

[52] U.S. Cl. ................ 502/216; 502/31; 502/33; 502/22; 502/168; 502/219; 502/220; 502/221; 502/222; 502/223

[58] Field of Search ........... 502/31, 33, 22, 168, 502/216, 219, 220, 221, 222, 223

[56] References Cited

U.S. PATENT DOCUMENTS

| | | | |
|---|---|---|---|
| 2,402,626 | 6/1946 | Howk | 502/216 X |
| 2,620,362 | 6/1946 | Stiles | 502/216 |
| 2,883,440 | 4/1959 | Raley | 502/168 X |
| 3,219,638 | 11/1965 | Warner | 502/168 X |
| 3,337,446 | 8/1967 | Engebretson et al. | 502/216 X |
| 3,715,404 | 2/1973 | Lindlar et al. | 502/168 X |
| 3,732,155 | 5/1973 | Cecil et al. | 208/210 |
| 4,098,682 | 7/1978 | O'Hara | 208/216 R |
| 4,132,632 | 1/1979 | Yu et al. | 208/216 PP |
| 4,334,982 | 6/1982 | Jacquin et al. | 502/220 X |
| 4,443,330 | 4/1984 | Nongbri | 502/219 X |
| 4,491,639 | 1/1985 | Happel et al. | 502/220 X |
| 4,508,847 | 4/1985 | Chianelli et al. | 502/222 X |
| 4,520,129 | 5/1985 | Murtha | 502/222 |
| 4,530,917 | 7/1985 | Benebi | 502/31 X |
| 4,548,920 | 10/1985 | Thompson | 502/219 |

Primary Examiner—Andrew H. Metz
Assistant Examiner—William G. Wright
Attorney, Agent, or Firm—Millen & White

[57] ABSTRACT

The invention concerns a process for sulfurizing a catalyst, particularly a refining catalyst comprising a carrier and active metal oxides.

In a first step, a sulfur compound mainly consisting of organic polysulfide is introduced into the catalyst mass. A second step consists of first sulfurizing, in the absence of hydrogen, the active metal oxides at a temperature lower than 275° C. and then activating the catalyst at a temperature higher than 275° C.

The present invention concerns a process for presulfurizing a hydrocarbon treatment catalyst and/or preconditioning a catalyst in view of subsequent presulfurization.

21 Claims, No Drawings

PROCESS FOR PRESULFURIZING A HYDROGEN TREATMENT CATALYST

BACKGROUND OF THE INVENTION

It is often desirable to proceed to a sulfurization (generally called "presulfurization") of the metals contained in certain refining and/or hydrocarbon hydroconversion catalysts, either when fresh catalysts are concerned, or at the end of the regeneration step of said catalysts, before reusing them.

A presulfurization of fresh or regenerated catalysts is thus desirable when using these catalysts in refining reactions, for example the reactions of desulfurization or hydrodesulfurization of various gasolines, for example catalytic cracking or steam-cracking gasolines, whose sulfur content has conveniently to be decreased before use, without modification of the less possible modification of the octane number of said gasolines. Such desulfurization reactions are generally conducted in the presence of hydrogen, from 200° to 400° C., under a pressure from, for example, 5 to 60 bars, at a space velocity (expressed in m3 of introduced liquid charge per m3 of catalyst and per hour) from 0.5 to 15, with a hydrogen partial pressure from 4 to 60 bars, the charge being for example a gasoline generally distilling between 30° and 220° C. and whose bromine number may range from 40 to 80 (g/100 g), containing about 15–45% by volume of olefins (essentially monoolefins—very small amounts of diolefins) and 15–25% of aromatic hydrocarbons.

The catalyst used in this type of desulfurization or hydrodesulfurization comprises a carrier, generally non acidic, for example an alumina or mixtures of aluminas (U.S. Pat. No. 4,334,982) or any other suitable carrier mainly of at least one metal or metalloid oxide (magnesia-U.S. Pat. Nos. 4,132,632, 4,140,626), silica, silica-aluminas, silica-magnesiae, fluorinated silicas, boron aluminas, clays, coals. fluroinated aluminas). This or these carrier mixtures may be at least partly in amorphous or crystallized form (zeolites) and the catalyst may further contain 0.2 to 30% of at least one active metal from groups VI, VIII or another metal selected for example from the group consisting of cobalt, molybdenum, nickel and tungsten (U.S. Pat. Nos. 3,732,155 and 3,804,748). Generally, these metals are used by pairs, for example one of the following pairs: cobalt-molybdenum, nickel-molybdenum, cobalt-tungsten, tungsten-molybdenum, cobalt-nickel, nickel-tungsten. Still by way of example, there can be used a noble metal from group VIII of the platinum family: Pt, Pd ... (U.S. Pat. No. 4,098,682).

Thus, before being used, the catalyst, fresh or regenerated, is generally subjected, in the prior art, to a sulfurization (presulfurization) conducted in a hydrodesulfurization reactor. By said sulfurization it is possible to introduce in the catalyst, for example, about 50 to 110% of the sulfur stoichiometrical amounts calculated on the sulfide amounts of formulas (according to the metals involved): $Co_9S_8Mo$ $S_2$, $WS_2$ and $Ni_3S_2$.

This sulfurization (presulfurization) is conducted, in the prior art, at a temperature substantially equal or higher than the reaction temperature (thus higher than 180° C. and more particularly above 250° C.) selected for the hydrodesulfurization reaction, for a few hours, by means of a mixture of hydrogen sulfide generally diluted in hydrogen (proportion of hydrogen sulfide in hydrogen of about 0.5–5% by volume) with a convenient space velocity, for example from about 1000 to 3000 liters of gas under normal temperature and pressure conditions per liter of catalyst and per hour (U.S. Pat. No. 4,334,982). The sulfurization (or presulfurization) itself may be conducted by temperature steps (French Pat. No. 2 476 119). Various sulfurization agents other than hydrogen sulfide ($H_2S$) may be used, for example a sulfur compound of the mercaptans family, carbon sulfide ($CS_2$), sulfides or disulfides, thiophenic compounds and preferably dimethylsulfide (DMS) or dimethyldisulfide (DMDS).

A sulfurization or presulfurization of the regenerated catalyst is also desirable in hydrocarbon hydroreforming reactions (particularly naphtha reforming) and in the production of aromatic hydrocarbons ("Aromizing") for example the production of benzene, toluene and xylenes (ortho, meta or para), either from unsaturated or saturated gasolines (for example pyrolysis, cracking, particularly steam-cracking, or catalytic reforming gasolines) or still from naphthenic hydrocarbons which, by dehydrogenation, can be converted to aromatic hydrocarbons.

The general conditions of these reactions are generally as follows: average temperature from 400° to 600° C., pressure from 1 to 60 bars, hourly velocity from 0.1 to 10 volumes of liquid naphtha per volume of catalyst and recycle rate from 0.5 to 20 moles of hydrogen per mole of charge.

The catalyst may contain for example, at least one metal from the platinum family, i.e. a noble metal such as platinum, palladium, iridium, rhodium, ruthenium, osmium, deposited on a convenient carrier (alumina, silica, silica-alumina, fluorinated aluminas, fluorinated silicas, zeolite etc. or mixtures of said carriers). The total content of noble metals ranges for example from 0.1 to 5% by weight, with respect to the catalyst. The catalyst may also contain generally at least one halogen (chlorine, fluorine etc.) in a proportion by weight from 0 to 15%. Still optionally, the catalyst may contain a least one promoter metal selected from the various groups of the periodic classification of elements, the proportion by weight of promoter metal varying for example from 0.1 to 15%. Examples of such metals are those from groups VIII, VI A and VI B, I B and II B, III A, IV A, V A and V B, IV B, III B, I A and I B, as well as the metals of the lanthanide family; more particularly, in addition to the noble or non noble metals from group VIII, copper, silver, gold, germanium, tin, indium, thallium, manganese, rhenium, tungsten, molybdenum, niobium and titanium are of interest.

For these reactions of catalytic reforming or aromatic hydrocarbons production, the sulfurization of the fresh or regenerated catalyst is accompanied with a reduction with hydrogen of the catalyst and takes place at the top of the reactor or in the vicinity thereof. The temperature in the sulfurization zone is determined by the temperature at which the reduction takes place, i.e. mostly between 480° and 600° C. The difficulty in this type of sulfurization on the site, i.e. at the vicinity of the reactors, has often led to time-consuming, although efficient sulfurization operations (U.S. Pat. No. 4,172,027).

The sulfurization agent used in the prior art is either hydrogen sulfide, pure or diluted with hydrogen or with gaseous hydrocarbons, or dimethyldisulfide diluted with hydrogen, or other sulfur compounds such as alkyl sulfides or alkylmercaptans, diluted with hydrogen. The pressure is that prevailing in the reforming reactor or the reactor for aromatic hydrocarbons production, the reaction time varying from a few minutes to a few days according to the selected operating conditions (see U.S. Pat. No. 4,172,027).

A sulfurization (presulfurization) of fresh or regenerated catalyst is sometimes still convenient for the partial or total sulfurization of the catalyst, also using one of the above-mentioned carriers and at least one of the already mentioned active metals convenient for the reactions of hydrocarbon conversion such as hydrogenation, dehydrogenation, alkylation, hydroalkylation, steam-dealkylation, isomerization and hydrodemetallization (or demetallation) of heavy charges.

The sulfurization or presulfurization, when necessary, may be advantageously performed according to any one of the above-indicated prior art techniques.

The metals of the catalysts used in refining, hydrorefining and petrochemistry, either fresh or regenerated, are mostly in oxidized form, sometimes in metal form, particularly for certain metals of reforming catalysts. Now, the metals of said catalysts are often active only in sulfurized or at least partially sulfurized form. It is hence necessary, for the refiner or the petrochemist to proceed to a sulfurization of the catalyst before using it.

Presently, the regeneration of the catalysts is more and more performed by a specialist of said catalyst regeneration, at a location sometimes far from the industrial unit. Now, it seems reasonable to provide to the refiner a product ready for use, after regeneration. This is possible by the efficient process disclosed in the European patent application No. 84 400 234 wherein the sulfur compound is incorporated to the catalyst mass so as to sulfurize or presulfurize the catalyst when, subsequently, in the reaction zone (zone of the charge treatment) or in the immediate vicinity thereof, the catalyst will be contacted with hydrogen. Of course, said sulfur compound may be, if desired, incorporated at the vicinity of the industrial unit or even on the mere location of the catalyst treatment unit: the process for incorporating said sulfur compound may be conducted out of site also on a fresh or regenerated catalyst, before its use in an industrial unit.

More precisely, according to the European patent application No. 84 400 234, the process for sulfurizing the catalyst is hence characterized by a preliminary step called step of incorporation in the catalyst mass of a sulfur compound of a particular nature.

The preliminary step of introducing a sulfur compound, arbitrarily called "out of site" or "ex situ" pretreatment, either performed at the vicinity of the industrial unit site or at a location more or less far from the industrial unit (at the location where the catalyst has been regenerated or where it has been manufactured, for example) in any way no longer takes place in the immediate vicinity of the reactor (arbitrarily referred to as "in situ") i.e. at the top of the reactors or zones more or less directly communicating with said reactors, requiring the use of operating conditions (temperature, pressure or others) at least partly dependent on the operating conditions of the reactors themselves or of ancillary elements of said reactors (for example, zone of preliminary hydrogenation of the catalyst).

In short, the invention of the European patent application No. 84 400 234 concerns a process whereby, when subjecting the catalyst, as soon as the beginning of its operation, preferably on the site ("in situ") to the conventional activation reaction in the presence of hydrogen (generally above 100° C.), it will be then possible, by means of the hydrogen present on the site, to sulfurize to the required extent (stoichoimetrical or non stoichiometrical), the one or more active metals contained in the catalyst. The process consists of incorporating, in the absence of hydrogen, in the pores of the fresh or regenerated catalyst, at least one sulfurization agent of general formula:

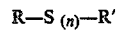

wherein R, R' and n are defined hereinafter.

The sulfurization of the catalyst may thus be performed as follows: in a first step performed "ex situ", in the absence of hydrogen, the catalyst is treated with at least one sulfurization agent so as to partially or completely incorporate said agent in the catalyst pores, the sulfurization agent being a polysulfide of general formula:

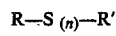

said sulfurization agent being used in solution in a solvent; in a second step, performed "in situ" and preferably above 150° C., the catalyst is activated in the presence of hydrogen, the required sulfur amount being fixed, owing to the presence of hydrogen, on the one or more metals contained in said catalyst. This last step is the one which is improved according to the present invention.

The object of the European patent application No. 84 400 234 is hence to conduct "ex situ" the presulfurization of the catalyst by incorporating the whole required sulfur amount and only the sulfur amount required by the user. Accordingly, the catalysts delivered to the refinery or to any other unit are preconditioned in view of being presulfurized.

The refiner, or any other user, thus have only to reactivate said catalyst in the presence of hydrogen at a temperature of, for example, from 100° to 200° C. for a desulfurization catalyst, from about 400° to 600° C. for a catalytic reforming or aromatic hydrocarbon production catalyst, so as to cause sulfur to react with the contained metals and start immediately the refining or hydrocarbon conversion reaction by injection of the charge to be treated.

In the polysulfide of formula R—S$_{(n)}$—R', n is an integer from 3 to 20, preferably from 4 to 8, more particularly from 5 to 7; R and R', identical or different, represent organic radicals each of which contains 1 to 150 carbon atoms per molecule, preferably either 10 to 60 carbon atoms or 5 to 40 carbon atoms and more particularly 7 to 16 carbon atoms, these radicals being selected from the group consisting of alkyl radicals either saturated or unsaturated, linear or branched, or of the naphthenic type, aryl radicals, alkylaryl radicals, arylalkyl radicals, these various radicals optionally comprising at least one hetero-atom. R' may optionally be also a hydrogen atom.

A preferred example of polysulfide is ditert-dodecylpolysulfide (n=5) wherein R and R' are each a dodecyl radical.

This product is sold on the trade, for example, by ELF AQUITAINE under reference TPS 32, particularly since it contains about 32% by weight of sulfur.

Another example is ditert-nonylpolysulfide (n=5) wherein R and R' are each a nonyl radical.

This product is sold by ELF AQUITAINE under reference TPS 37, particularly since it contains about 37% by weight of sulfur or by PENWALT under reference TNPS.

For reasons of procedure this sulfurization agents of the polysulfide type may be used alone or admixed together in judiciously selected proportions.

The first step, as above recalled, is performed in the absence of hydrogen and provides, with a great accuracy, for the total or partial sulfurization degree required by the user. This sulfur incorporation is conducted between 0° and 50° C., preferably between 10° and 35° C., and more preferably at room temperature.

The sulfurization agent is diluted in a suitable solvent which depends particularly on the nature of the sulfurization agent, i.e. on R or R', radicals which determine the sulfur content incorporated with the catalyst, generally by capillarity or by porosity. The sulfurization processes vary in fact according to the cuts to be subsequently treated in the presence of the catalysts treated according to the invention. The selected solvent may thus be one of the following solvents used alone or admixed together:

- a light gasoline boiling for example between about 60° and 95° C.,
- a gasoline of hexane type boiling between about 63° and 68° C.,
- a gasoline of F type boiling between about 100° and 160° C. and generally containing 10-20% of aromatic hydrocarbons, for example 15%, by volume,
- a gasoline of "white spirit" type boiling between about 150° and 250° C. and generally containing 14-22% of aromatic hydrocarbons, for example 17% by volume,
- or any hydrocarbon or non hydrocarbon cut equivalent to the preceding gasolines.

Later, on the site or in the vicinity thereof (site where the catalyst will be used for the treatment of various charges) during the conventional activation reaction, performed in the presence of hydrogen (second step of the process of the European patent application No. 84 400 234), the sulfurization agent introduced into the catalyst in predetermined amounts will be capable to give rise to hydrogen sulfide which, in the presence of hydrogen, will give the desired sulfide or sulfides of the one or more metals present in the catalyst, according for example to the following schematic reactions (1) (2) (3) as far, for example, as sulfurizations of molybdenum, cobalt and nickel are concerned.

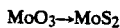

$MoO_3 \rightarrow MoS_2$

$9\ CoO \rightarrow Co_9S_8$

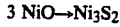

$3\ NiO \rightarrow Ni_3S_2$

By the use of a suitable solvent, wherein the sulfurization agent is dissolved, it is possible to take advantage of the latent vaporization heat of the selected solvent to absorb at least a part of the exothermicity of the sulfurization reaction.

After the sulfur deposit, at least a portion of the solvent remains in the catalyst. It is thus possible to remove said solvent (by stripping with liquid nitrogen for example or by any other means). However, said solvent retained in the catalyst may be removed subsequently without any damage, within the reactor where the catalyst is used, i.e. on the site ("in situ").

In the first step, the volume of polysulfide and of selected solvent must be preferably substantially equal to the pore volume of the catalyst bed to be treated: thus, for example, for 100 g of regenerated or fresh catalyst (oxidized form) about 9 g of sulfur, as polysulfide, are to be introduced into about 45 cc of total mixture polysulfide+solvent (e.g. white spirit). The adsorption of said polysulfide generally takes place in ambient air. The catalyst is then optionally dried in hot air stream, then conditioned in order to be dispatched, according to a preferred method, to the refiner.

SUMMARY OF THE INVENTION

According to the present invention, it has been discovered that, during the first part of the second step, the presence of hydrogen is not only unnecessary but, on the contrary, it is preferable to proceed in its absence, provided however that, during the end of said second step, performed "ex situ" or "in situ", and optionally in the presence of hydrogen, the catalyst be brought, at least for about one minute, to a temperature of at least 275° C.

The first part of said second step is conducted "in situ" or "ex situ". Thus, the first part of the second step is performed in the absence of hydrogen under atmosphere of inert gas (nitrogen, argon, helium etc.) or of non-inert gas or of a mixture of such gases, for example air, for about at least 5 minutes at a temperature from 65° to 275° C. More precisely, when operating in the presence of an inert gas, the operation will be preferably conducted for about 1 to 3 hours, under a pressure ranging from about 0.5 to 70 bars, at a temperature from 65° to 275° C., preferably from 85° to 260° C. and more particularly from 95° to 150° C. When it is desired to operate in the presence of a non-inert gas, such as air particularly, it would be convenient to operate in about 5 minutes (or better 9 minutes) to 10 hours, under 0.5–70 bars, at a temperature lower than 200° C. and preferably lower than 150° C.

When operating in air, at a temperature lower than 200° C., the combustion of the fixed sulfur, which evolve as SO₂, begins; this is contradictory to the desired result, but has however the economical advantage of working in air, thus saving the costly installations required for the use of an inert atmosphere.

During the second part of the second step, the catalyst is brought to a temperature of at least 275° C., preferably from 300° to 400° C. and, for example, about 350° C. (mainly between 275° and 380° C.) when using air in the first part of the second step, for at least about 5 minutes in the optional presence of hydrogen. The operation may last 5 to 10 minutes or more, for example 1 hour.

This part of step is generally conducted "in situ" and hence may take place during the starting or on-stream operation of the refining or petrochemical reaction to which is destined the catalyst prepared according to the present invention, precisely when such a reaction takes place above 275° C.

When the selected temperature for the refining or petrochemical reaction is lower than 275° C. (for example in gasolines or kerosenes hydrodesulfurizations), it then suffices to decrease the temperature in the second part of the second step, after said step, to a temperature convenient to said reaction.

It has been observed that, in the first part of the second step, in spite of the hydrogen absence, the catalyst becomes sulfided i.e. the oxides of the catalyst active metals are converted to sulfides according to the above-mentioned chemical reactions. This phenomenon is easily observed by analysis of the catalyst which, in fact, becomes black. On the contrary, the chemisorption tests show that, as long as the catalyst does not reach a temperature of 275° C. and is not maintained for at least a few minutes at a temperature of at least 275° C., said catalyst remains deprived of catalytic activity.

It must be observed that the gas used in the first part of the second step may be at least partly steam, superheated at 110° C. at least. Also humid air may be used and then the operation may be conducted with a relative humidity of about 0–60% by volume at the drying step and/or with a preactivation conducted between 105° and 200° C., preferably between 110° and 170° C. with a gas whose water content ranges from 50 to 100% (pure steam), preferably between 90 and 100%.

Briefly stated, during the first part of the second step, the oxides of active metals are converted to sulfides, the catalytic activity of said sulfides appearing only when the catalyst temperature reaches about 275° C., optionally in the presence of hydrogen (second part of the second step). The technique of the invention provides immediately several advantages. The first part of the second step being conducted in the absence of the hydrogen, the hydrogen admission is performed later than in the process according to the European patent application No. 84 400 234 and accordingly, the hydrogen consumption is reduced. The first part of said second step is no longer exothermic, which is very advantageous (particularly for security purposes) for the refiner when said first part of the second step is conducted in situ. At the end of the first part of the second step, the catalyst is not pyrophoric at all as long as it does not reach the temperature of about 275° C., i.e. it is incapable of adsorbing oxygen (exothermic process from which originates the pyrophoricity of the sulfurized catalyts). This catalyst is thus insensitive to air and can be handled without particular care. Thus, when so desired, said first part of the second step (conversion of oxides of active metals to sulfides) may be performed on the regeneration site ("ex situ") and then the catalyst, optionally previously dried, insensitive to air, is conveyed by truck or by air for example, not only presulfurized, as taught in European patent application No. 84 400 234 (sulfur incorporated into the catalyst pores in the form of organic polysulfide), but already sulfurized, from the regeneration site up to the refiner's or petrochimist's location, wherein the catalyst has to be directly placed into the refining or petrochemical unit to which it was destined, and heated to a temperature of at least 275° C. for at least one minute, optionally with introduction of hydrogen (always necessary for the subsequent operations in the unit). At this stage, other advantages become apparent as well for the regeneration of the catalyst as for the use thereof when the first part of the second step is conducted "ex situ": during said first part of the second step, the solvent wherein the organic polysulfide was dissolved (e.g. white spirit) evaporates. Accordingly, this solvent remains on the regeneration site and is recovered after regeneration or presulfurization of the catalyst. The refiner or the petrochemist have not, for their part, to make provision for extraction ducts for said solvent. Similarly, the water which may be formed during the sulfurization of active metal oxides, is removed on the regeneration site and the refiner or the petrochemist have not to provide their units with ducts for water removal.

During the second part of the second step (activation), the catalyst thus becomes liable to adsorb oxygen, hence to activate the refining and petrochemical reactions. This activation may be performed in situ, i.e. in the refining or petrochemical reactor, but also ex situ when so desired, for example when the refining reaction takes place at low temperature and when the reactor selected for said reaction has not been designed to sustain high temperatures (mechanical stresses). It has also been observed that the catalyst, when subjected to the treatment of the present invention, has an improved activity not only with respect to the conventional sulfurization techniques (e.g. by $H_2S$) but also with respect to the technique of the European patent application No. 84 400 234. Thus, as a general rule, the activity of the catalyst is in inverse proportion to the catalyst volume used in a refining reaction. Now, when operating according to the invention, it has been observed that identical performances in refining can be obtained by using a catalyst volume reduced by about 5% with respect to the volume used with a catalyst sulfurized with $H_2S$ and the catalyst volume is reduced by at least about 2% with respect to the volume of sulfurized catalyst used according to the method of the European patent application 84 400 234.

It should be observed that said second part of the second step may be advantageously conducted in the presence of both hydrogen and a hydrocarbon liquid cut consisting preferably, for example, of a portion at least of the cut to be subsequently treated over said catalyst. This method, since the second part of the second step is slightly exothermic, takes advantage of the presence of a liquid which wets the catalyst, thereby providing for a better release of the calories. This technique further provides for an improvement of the catalyst qualities.

During the first step of the catalyst treatment, the polysulfide may be incorporated "ex situ" in the catalyst pores, in the presence of at least one additive having reducing properties and which is selected from the group consisting of aldehydes containing 4–14 carbon atoms per molecule (preferably 5–12 carbon atoms), ketones or polyketones containing about 3–18 (preferably 5–12) carbon atoms per molecule, ethers containing 5–14 (preferably 6–12) carbon atoms per molecule, alcohols or polyalcohols containing 5–14 (preferably 6–12) carbon atoms per molecule and organic acids or polyacids containing 3–14 (preferably 6–12) carbon atoms per molecule.

The one or more selected additives are advantageously used in a proportion of 0.4–8%, preferably 0.8–4% and more particularly 0.9–3% with respect to the weight of the one or more polysulfides.

The one or more additives may be added, for example, with the solution of the one or more polysulfides, either in pure state or dissolved in a convenient solvent. This solvent may be of the same type as the solvent selected to dissolve the polysulfide, i.e. for example:

- a light gasoline boiling for example between about 60° and 95° C.,
- a gasoline of the hexane type boiling between about 63° and 68° C.,
- a gasoline of F type boiling between about 100° and 160° C. and generally containing 10–20% of aromatic hydrocarbons, for example 15% (by volume),
- a gasoline of the "white spirit" type, boiling between about 150° and 250° C. and generally containing 14–22% of aromatic hydrocarbons, for example 17%, by volume, any hydrocarbon or non-hydrocarbon cut, equivalent to the preceding gasolines.

The one or more additives according to the invention may be used in another solvent such, for example, as alcohols (methanol, ethanol, propanol etc.) or other inorganic or organic liquids known to dissolve the aldehydes, ketones, ethers, alcohols, polyalcohols, acids and polyacids to be used according to this invention.

Examples of preferred additives are in particular: acetyl acetone, diketone, acetonyl acetone, lactic acid and citric acid.

The effect of the additive is to increase, during the first part of the second step, the degree of reduction of the metal oxides, to reduce these oxides more quickly, thus favoring the kinetics of oxygen replacement with sulfur and further favouring the dispersion of the metals within the catalyst.

Consequently, the starting of the proper refining or hydroconversion reactions will be speeded up.

EXAMPLES

The following examples 1 to 3 illustrate, for the hydrorefining or hydrotreatment of a hydrocarbon cut, the effect of the catalyst regeneration method according to the invention.

The cut to be hydrorefined is a typical charge containing by weight:
20% of toluene,
2% of thiophene,
78% of cyclohexane.
The operating conditions are as follows:
temperature: 350° C.,
total pressure: 60 bars,
VVH: 2,
H2/HC: 350 1/h,
treatment time: 48 hours.
Volume of involved catalyst: 40 cc in the three examples 1 to 3 in view to determine the way giving the best performances.

The effluents are analyzed by gas chromatography. In each test, the activity for hydrogenation ("A") of toluene and the activity for isomerization ("I") of cyclohexane to methylcyclopentane are measured;

$$A = \text{Log} \frac{1}{1-X}$$

(Naperian logarithm) wherein X is the toluene conversion rate, i.e.:

$$X = \frac{\Sigma P}{\Sigma T}$$

$\Sigma P$ being the sum of molar contents of toluene conversion products (methylcyclohexane, ethylcyclopentane and dimethylcyclopentanes) and $\Sigma T$ is the sum $\Sigma P$+content of residual toluene.

X ranges from 0 to 1, X being 1 for a 100% toluene conversion:

$$I = \frac{100 \times \text{methylcyclopentane } MC}{\text{methylcyclopentane } MC + \text{residual cyclohexane } MC}$$

(MC being the molar content).
(The catalyst acidity may be measured from the isomerization activity I).

The catalyst is a catalyst of the trade, manufactured by Procatalyste Company under reference HR 346 and containing 3% by weight of nickel oxide (NiO) and 14% of molybdenum oxide (MoO3), said active metal compounds being deposited on a γ alumina.

EXAMPLE 1 (Comparative)

Before starting the hydrorefining operations, the catalyst is presulfurized according to a conventional method as follows:

The catalyst, whose active metals are present as oxides, NiO and MoO3, is charged into the reactor.

The unit is purged under hydrogen, at cold, under a pressure of 1 bar (it has been ascertained that the results would be the same when operating this step under a higher pressure of, for example, 60 bars).

The catalyst is heated to 150° C. in hydrogen, under 1 bar (or 60 bars).

A sulfurization charge is introduced at the inlet of the reactor, at a temperature of 150° C. (under a pressure of 60 bars). This charge contains by weight:
20% of toluene,
2% of dimethyldisulfide,
78% of cyclohexane.

The dimethyldisulfide produces the sulfurization of the nickel and molybdenum oxides. The sulfurization operating conditions are as follows:
VVH: 2
H2/HC: 350 1/h The temperature is increased to 280° C. and the sulfurization is continued for 2 hours. Then, the temperature is brought to 320° C. for 2 hours and, finally, to 350° C. for two further hours. Once the catalyst sulfurization performed, the sulfurization charge is replaced with the charge to hydrorefine and the hydrorefining of said charge is conducted under the above-mentioned operating conditions.

The results are: A=0.79, I=0.29.

EXAMPLE 2: (comparative)

In this example, the catalyst is sulfurized according to the method of the European patent application No. 84-400234, in two steps:

First step:
TPS 37, manufactured by Elf Aquitaine, which contains about 37% by weight of sulfur (its formula is given hereabove); is used for presulfurizing the catalyst. In order that all the polysulfide be absorded, the volume of reactant (polysulfide+polysulfide solvent) must be equal to the impregnation volume of the treated catalyst charge. The amount of solvent to be used is determined in relation with said total pore volume or impregnation volume. In the present test, this volume, for 100 g of catalyst, is 45 ml, as an average (comprising 60% of solvent and 40% of polysulfide). The solvent is a "white spirit" (boiling temperature from 150° to 250° C.).

The required sulfur stoichiometry is used to subsequently sulfurize the totality of the oxides (NiO, MoO3) i.e. 7.1% S. The catalyst is thus dry impregnated and subjected to a subsequent evaporation under 10 mm of mercury or under an inert gas stream.

Second step:
The catalyst, whose metals are present as oxides and contain sulfur in their pores, is introduced into the reactor. The reactor is purged of air and placed in hydrogen atmosphere, at cold, under 1 bar (subsequent results are not changed when the selected pressure is higher, for example 60 bars). The catalyst impregnated with polysulfide is heated under hydrogen to 150° C. and said temperature of 150° C. is maintained for two hours. The catalyst becomes black as a result of the formation of metal sulfides. The analysis of the catalyst, sulfurized with TPS 37, gives as sulfur proportion 7.4% S (by weight) and a carbon proportion of 2% (by weight).

Hydrorefining test:

The pressure in the reactor is brought to 60 bars and the temperature is increased without intermediary step, up to 350° C.

Results:
A=0.81, I=0.40.

EXAMPLE 3: (according to the invention)

The first step is identical to the first step of example 2.
Second step:

(1) First part of the second step:

The catalyst is introduced into the reactor, which is purged, at cold, to remove air. The reactor is placed in nitrogen atmosphere under a pressure of 1 bar (the same results would be obtained under a higher pressure of, for example, 60 bars).

The catalyst is heated for 2 hours.

In order to illustrate the invention, four separate tests are conducted, each at a different temperature.

Test $T_1$ is conducted at 150° C.
Test $T_2$ is conducted at 100° C.
Test $T_3$ is conducted at 75° C.
Test $T_4$ is conducted at 275° C.

In each test, the catalyst becomes black, the oxides being converted to sulfides. At the end of each test the catalyst contains 7.1% of sulfur (by weight). The carbon content (by weight) is 3% in tests $T_1$ and $T_4$, 1% in test $T_2$ and 3.5% in test $T_3$.

(2) Second part of the second step and hydrorefining tests:

The reactor is placed under hydrogen atmosphere, at cold. The pressure is brought to 60 bars and the temperature to 150° C.

The charge is injected as in the two preceding examples. Then the temperature is brought to 300° C. for one hour and then to 350° C. for the test.

The first part of the first step is conducted, by way of illustration, at three different temperatures, i.e. 150° C. (test $T_1$), 100° C. (test $T_2$), 275° C. (test $T_4$) and 75° C. (test $T_3$).

The results of these tests are given in the following table.

|  | TEST | | | |
|---|---|---|---|---|
| Temperature (°C.) | $T_1$ 150 | $T_2$ 100 | $T_4$ 275 | $T_3$ 75 |
| A | 0.82 | 0.85 | 0.75 | 0.68 |
| I | 0.74 | 1.2 | 0.74 | 0.55 |

It has been ascertained that the results are the same when the first part of the second step is conducted on the presulfurization site. This means that the transportation of the catalyst and its handling in air did not result in any damage for this catalyst.

EXAMPLE 4: (according to the invention)

The first step is identical to the first step of example 2.
Second step:

(1) First part of the second step

The catalyst is introduced into the reactor which is pressurized to 1 bar in the presence of air. (The same results would be obtained under a higher pressure of, for example, 60 bars). The catalyst is heated for one hour. Five separate tests are conducted under different temperatures in order to illustrate the invention:

Test Ta is performed at 115° C.
Test Tb is performed at 120° C.
Test Tc is performed at 150° C.
Test Td is performed at 200° C.
Test Te is performed at 250° C.

The catalyst becomes black at a temperature from about 115° to 200° C., with water deposit.

$SO_2$ contained in the gas effluents is measured by means of an infrared analyzer of trade mark COSMA.

The sulfur content by weight of the catalyst after each test is as follows:

|  | Ta | Tb | Tc | Td | Te |
|---|---|---|---|---|---|
| % S | 6.00 | 6.10 | 5.95 | 5.50 | 2.95 |

(2) Second part of the second step and hydrorefining tests

The second part of the second step is here identical to that of example 3.

The hydrorefining tests are conducted as in example 3, i.e. after having maintained the catalyst in the presence of hydrogen and of the charge at 300° C. for one hour, (second part of the second step), the test is conducted at 350° C.

The results are given in the table below, in relation with the nature of the first part of the second step.

| Nature of the first part of the second step | Ta | Tb | Tc | Td | Te |
|---|---|---|---|---|---|
| A | 0.81 | 0.83 | 0.83 | 0.80 | 0.20 |
| I | 0.75 | 0.78 | 0.74 | 0.60 | 0.1 |

During the first part of the second step, it is possible to proceed in the presence of for example, (instead of air) a mixture containing 5% by volume of air and 95% by volume of steam initially overheated at 115° C. Thus, in that case, in the test $T_c$, for example, it is obtained: A=1.10, I=1.03.

EXAMPLE 5

Example 4 is repeated except that the second part of the second step is performed in hydrogen at 300° C. for 10 minutes, then the hydrorefining charge is introduced and the temperature is increased to 350° C.

The result of the test is identical for each of the three methods Ta, Tb and Tc used in the first part of the second step:
A=0.83
I=0.73

EXAMPLE 6

Example 5 is repeated except that the hydrocarbon charge is introduced in the presence of hydrogen, as soon as the temperature reaches 150° C. The test results are as follows (for the 3 methods Ta, Tb and Tc):
A=0.85
I=0.77

EXAMPLE 7

When the sulfurized catalyst according to the invention is destined to be used in a refining reaction at a temperature lower than 275° C. (e.g. a pretreatment of a reforming charge) it is thus convenient, according to the invention, to heat the catalyst for at least 1 hour to at least 275° C., for example, one hour at 350° C. and 2 hours at 300° C., during the second part of the second step. As a matter of fact, the chemisorption of oxygen shows that there is a direct relationship between the sulfurization rate and the oxygen consumption (expressed for example as oxygen moles per gram of catalyst). Thus, for determining the activity of the catalyst of example 3, previously subjected to the first part of the second step, for two hours at 15° C. (in the conditions of example 3), this catalyst is subjected, in a chemisorption cell, to various temperatures under argon atmosphere, for one hour. After each manipulation the oxygen consumption is measured.

| Temperature (°C.) | Measurement of oxygen absorption (using as unit $10^{-4}$ mole of oxygen per g of catalyst) |
|---|---|
| 150 | 0 |
| 200 | $\leq 0.02$ |
| 250 | $\leq 0.01$ |
| 275 | 0.5 |
| 300 | 0.5 |
| 350 | 1.8 |
| 400 | 1.8 |

This table shows that the catalyst activity develops only above about 275° C. When the catalyst does not reach this temperature, it remains inert with respect to oxygen; hence, as a counterpart, it can handled in air and is thus transportable as long as the second part of the step is not performed.

EXAMPLE 8

A HR 346 catalyst is presulfurized ex-situ as in example 4 (method Tc). At the end of the first part of the second step, performed in air, the absence of oxygen chemisorption by the catalyst is ascertained. The catalyst is stored in a closed flask, not tight, in air, for 15 days. No evolution appears. It is used in a CATATEST reactor and a coking gas-oil is subjected to a HDS and hydrodenitrogenation test: once the catalyst charged, the reactor is purged of air, then scavenged at cold with $H_2$. The pressure is brought to 100 bars and the reactor heated. The gas-oil charge is introduced when the catalyst temperature reaches 150° C. The temperature is then increased up to 300° C. and is maintained at said level for 15 minutes, then the reaction temperature (300° C.) is maintained and this test, which is very representative of industrial conditions of use of the catalyst, is performed.

The tests conditions are indicated in table 2. The characteristics of the coking gas oil charge are given in table 1.

The performances in stabilized HDS and HDN, after 60 hours and then 120 hours of continuous operation, are compared with the performances obtained in the same conditions, with the same catalyst but presulfurized in-situ in the manner described in example 1:

|  | 100 b VVH = 4 after 60 h | | 60 b VVH = 2 after 120 h | |
|---|---|---|---|---|
|  | HDS | HDN | HDS | HDN |
| reference | 96.4 | 84.6 | 97.0 | 81.0 |
| catalyst presulfurized according to the invention | 95.7 | 85.7 | 97.3 | 82.7 |

The technique of ex-situ presulfurization in air gives a better result than the presulfurization technique used as reference.

TABLE 1
CHARACTERISTICS OF THE TEST CHARGE

| CHARGE | COKING GO |
|---|---|
| Density at 20° C. (g/cm3) | 0.857 |
| Sulfur (% b.w.) | 0.45 |
| Nitrogen (ppm b.w.) | 420 |
| Average molecular weight (g) | 205 |
| Bromine number (g % g) | 17 |
| Cloud point (°C.) | −9 |
| Cetane number | 40 |
| Distillation | FS MO7-002 |
| IP (°C.) | 161 |
| 5% (°C.) | 194 |
| 10% (°C.) | 203 |
| 50% (°C.) | 256 |
| 90% (°C.) | 328 |
| 95% (°C.) | 338 |
| FP (°C.) | 350 |

TABLE 2
CHARACTERISTICS OF THE CATALYTIC TEST

|  | COKING GO TEST |
|---|---|
| Step 1 | |
| Total pressure (bars) | 100 |
| Temperature (°C.) | 360 |
| V.V.H. | 4 |
| $H_2$/HC ratio (N1/1) | 250 |
| Time (hours) | 60 |
| Step 2 | |
| Total pressure (bars) | 60 |
| Temperature (°C.) | 360 |
| V.V.H. | 2 |
| $H_2$/HC ratio | 250 |
| Time (hours) | 60 |
| Catalyst volume (cm3) | 50 |
| Presulfurization by toluene + $CC_6$ + DMDS charge | |

What is claimed as the invention is:

1. A process for a two step treatment of a fresh or regenerated catalyst containing (a) a carrier consisting essentially of at least one metal or metaloid oxide and (b) at least one active metal wherein, in a first step performed ex-situ at a temperature from about 0 to 50° C. and in absence of hydrogen, the catalyst is treated with at least one sulfurization agent, so as to partially or completely incorporate said agent in the catalyst pores, the sulfurization agent being a polysulfide of general formula:

$$R-S_{(n)}-R'$$

wherein n is an integer from 3 to 20 and R' is a hydrogen atom or another radical identical to or different from radical R, these two radicals thus representing each an organic radical containing 1 to 150 carbon atoms per molecule, said radicals being selected from the group consisting of alkyl radicals, saturated or unsaturated, linear or branched radicals or radicals of the naphthenic type, aryl radicals, alkylaryl radicals and arylalkyl radicals, said sulfurization agent being used in solution in a solvent, said process further comprising a second step of treating the catalyst obtained in the first step by a method wherein: (a) the catalyst, in the first part of second step, is treated, in the absence of hydrogen and in the presence of an inert or non-inert gas, for at least about 5 minutes, "in-situ" or ex-situ at a temperature from 65° to 275° C., under a pressure from about 0.5 to 70 bars, to convert oxides of active metal to black catalytically inactive sulfides and (b) said catalyst is then treated, in the second part of said second step, in the presence of hydrogen, for at least about 1 minute at a temperature higher than 275° C., said temperature being also sufficiently high to activate the catalyst.

2. A process according to claim 1, wherein the first part of said second step is conducted in the presence of an inert gas at a temperature ranging from 75° to 275° C.

3. A process according to claim 2, wherein the temperature in said first part of the second step is from 85° to 260° C., said first part of the first step lasting about 1 to 3 hours, the temperature in said second part of the second step being from 300° to 400° C.

4. A process according to claim 1, wherein the first part of said second step is conducted in the presence of air for a time period from 5 minutes to 10 hours, at a temperature lower than 200° C.

5. A process according to claim 4, wherein the first part of said second step is conducted in the presence of air, for a time period from 9 minutes to 10 hours, at a temperature lower than 150° C., the temperature of said second part of the second step being from 275° to 380° C.

6. A process according to claim 1, wherein said gas consists of at least steam superheated at a temperature higher than 110° C.

7. A process according to claim 4, wherein said gas is wet air.

8. A process according to claim 2, wherein the second part of said second step is performed "in situ".

9. A process according to claim 2, wherein the second part of said second step is performed "ex situ".

10. A process according to claim 3, wherein the first part of said second step is performed "in situ".

11. A process according to claim 9, wherein said first part of said first step is performed "ex situ".

12. A process according to claim 1, applied either to the treatment of a fresh catalyst, before its use, or to the treatment of a catalyst which has just been subjected to a regeneration out of site, before its use.

13. A process according to claim 13, wherein the operation is conducted in the presence of a liquid hydrocarbon cut.

14. A process according to claim 1, wherein the hydrocarbon cut is at least a part of the cut to be subsequently treated over the catalyst.

15. A process according to claim 1, wherein, in the formula R—S(n)—R', n is an integer from 4 to 8, R and R' containing each 5 to 40 carbon atoms per molecule.

16. A process according to claim 1, characterized in that the first step is conducted in the presence of 0.4 to 8% by weight, with respect to the polysulfide weight, of at least one additive selected from the group consisting of aldehydes containing 4 to 14 carbon atoms per molecule, ketones or polyketones containing 3 to 18 carbon atoms per molecule, ethers containing 5 to 14 carbon atoms per molecule, alcohols or polyalcohols containing 5 to 14 carbon atoms per molecule and organic acids or polyacids containing 3 to 14 carbon atoms per molecule.

17. A process according to claim 1, wherein the catalyst is dried prior to the second step of treating the catalyst.

18. A process according to claim 1, wherein the catalyst is dried after step (a) and before (b).

19. A process according to claim 17, wherein the catalyst is dried after step (a) and before (b).

20. A process according to claim 1, wherein step (a) is performed "ex-situ".

21. A process according to claim 1, wherein both steps (a) and (b) are performed "ex-situ".

* * * * *